US012706366B2

(12) United States Patent
Tang et al.

(10) Patent No.: US 12,706,366 B2
(45) Date of Patent: Aug. 11, 2026

(54) MICROELECTRONIC PACKAGE WITH ANTENNA WAVEGUIDE

(71) Applicant: TEXAS INSTRUMENTS INCORPORATED, Dallas, TX (US)

(72) Inventors: Yiqi Tang, Allen, TX (US); Rajen Murugan, Dallas, TX (US); Harshpreet Bakshi, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 172 days.

(21) Appl. No.: 18/104,124

(22) Filed: Jan. 31, 2023

(65) Prior Publication Data

US 2024/0258704 A1 Aug. 1, 2024

(51) Int. Cl.
*H01P 5/107* (2006.01)
*H01Q 1/48* (2006.01)
*H01Q 9/04* (2006.01)

(52) U.S. Cl.
CPC ............... *H01P 5/107* (2013.01); *H01Q 1/48* (2013.01); *H01Q 9/0407* (2013.01)

(58) Field of Classification Search
CPC ........................................................ H01P 5/107
See application file for complete search history.

(56) References Cited

U.S. PATENT DOCUMENTS 5,895,967 A 4/1999 Stearns et al.
6,624,003 B1 9/2003 Rice
7,365,683 B2 4/2008 Park
8,138,588 B2 3/2012 Haskett
8,942,643 B2 1/2015 Ginsburg et al.
9,614,584 B2 4/2017 Herbsommer et al.
9,646,906 B2 5/2017 Cook et al.
9,647,329 B2 5/2017 Herbsommer et al.
9,666,553 B2 5/2017 Murugan et al.
11,258,161 B2 2/2022 Moallem et al.
(Continued)

OTHER PUBLICATIONS

Desai et al., How antenna-on-package design simplifies mmWave sensing in buildings and factories, Texas Instruments Incorporated, Dallas, Texas, Jul. 2019.
(Continued)

*Primary Examiner* — Daniel Munoz
(74) *Attorney, Agent, or Firm* — Xiaotun Qiu; Frank D. Cimino

(57) ABSTRACT

A microelectronic package includes a waveguide radiation receiver formed in a first conductor layer of a multilayer package substrate, the multilayer package substrate comprising the first conductor layer spaced from a second conductor layer by a dielectric layer. The microelectronic package further includes a tubular waveguide mounted to the multilayer package substrate such that a central aperture of the tubular waveguide is over the waveguide radiation receiver, and a feed line coupling the waveguide radiation receiver to a transmitter-receiver, the feed line including a conductive via traversing the dielectric layer electrically coupling a first portion of the feed line in the first conductor layer to a second portion of the feed line in the second conductor layer, the first portion adjacent the waveguide radiation receiver, and the second portion adjacent the transmitter-receiver.

25 Claims, 13 Drawing Sheets

(56) References Cited

U.S. PATENT DOCUMENTS

| | | | | |
|---|---|---|---|---|
| 11,552,382 | B2 | 1/2023 | Moallem et al. | |
| 2008/0231518 | A1 | 9/2008 | Tsutsumi et al. | |
| 2011/0050534 | A1 | 3/2011 | Shimayama et al. | |
| 2015/0364816 | A1 | 12/2015 | Murugan et al. | |
| 2017/0324135 | A1* | 11/2017 | Blech | H01Q 1/38 |
| 2018/0226314 | A1 | 8/2018 | Chen et al. | |
| 2019/0013288 | A1 | 1/2019 | Kim et al. | |
| 2019/0304934 | A1 | 10/2019 | Kamphuis et al. | |
| 2019/0312358 | A1* | 10/2019 | Rogers | H01P 3/081 |
| 2020/0118949 | A1 | 4/2020 | Moallem et al. | |
| 2020/0185816 | A1 | 6/2020 | McCormack et al. | |
| 2020/0194871 | A1 | 6/2020 | Moallem et al. | |
| 2020/0212536 | A1 | 7/2020 | Gupta et al. | |
| 2020/0259240 | A1 | 8/2020 | Moallem | |
| 2020/0373677 | A1* | 11/2020 | Rogers | H01Q 1/38 |
| 2020/0403299 | A1 | 12/2020 | Gupta et al. | |
| 2021/0328367 | A1 | 10/2021 | Tang et al. | |
| 2022/0209391 | A1 | 6/2022 | Tang et al. | |
| 2022/0336383 | A1 | 10/2022 | Herbsommer et al. | |
| 2022/0359976 | A1 | 11/2022 | Tang et al. | |
| 2025/0040046 | A1* | 1/2025 | Eriksson | H05K 1/115 |

OTHER PUBLICATIONS

Gomi et al., Low-Loss GCPW-to-WG Transition in Multilayer Resin Substrate for Millimeter-Wave Applications, 2012 42nd European Microwave Conference, pp. 285-288, Amsterdam, Netherlands, 2012.

Lovescu et al., The fundamentals of millimeter wave sensors, Texas Instruments Incorporated, Dallas, Texas, May 2017.

Park et al., Design and Analysis of a TEM Mode Rectangular Coaxial Waveguide for Mobile 5G Millimeter Wave Antenna Module Applications, Journal of Electromagnetic Engineering and Science, vol. 20, pp. 169-175, Seoul, Korea, Jul. 2020.

* cited by examiner

MICROELECTRONIC PACKAGE WITH ANTENNA WAVEGUIDE

TECHNICAL FIELD

This disclosure relates to microelectronic packages, and more particularly to microelectronic packages including antennas.

BACKGROUND

Processes for producing microelectronic packages include mounting a semiconductor die to a package substrate and covering the electronic devices with a dielectric material such as a mold compound to form packaged devices.

Antennas are increasingly used with microelectronic devices and portable devices, such as communications systems, communications devices including 4G, 5G or LTE capable cellphones, tablets, and smartphones. Additional applications include microelectronic devices in automotive systems such as radar, navigation and over the air communications systems. While incorporating antennas with semiconductor devices in a microelectronic package is desirable, mold compounds used in molded microelectronic devices and some substrate materials used when packaging semiconductor devices have high dielectric constants of about 3 or higher, which can interfere with the efficiency of embedded antennas. Systems using antennas with packaged semiconductor devices therefore often place the antennas on a separate printed circuit board, an organic substrate, spaced from the semiconductor devices. These approaches require additional elements, including expensive printed circuit board (PCB) substrates, which are sometimes used inside a module with semiconductor dies, or sometimes used with packaged semiconductor devices provided spaced apart from the antennas.

BRIEF SUMMARY

Packages with integrated antennas disclosed herein include a multilayer package substrate with a conductive layer forming an antenna, and a waveguide mounted to the multilayer package substrate over the antenna.

In one example, a microelectronic package includes a waveguide radiation receiver formed in a first conductor layer of a multilayer package substrate, the multilayer package substrate comprising the first conductor layer spaced from a second conductor layer by a dielectric layer. The microelectronic package further includes a tubular waveguide mounted to the multilayer package substrate such that a central aperture of the tubular waveguide is over the waveguide radiation receiver, and a feed line coupling the waveguide radiation receiver to a transmitter-receiver, the feed line including a conductive via traversing the dielectric layer electrically coupling a first portion of the feed line in the first conductor layer to a second portion of the feed line in the second conductor layer, the first portion adjacent the waveguide radiation receiver, and the second portion adjacent the transmitter-receiver.

In another example, a method of forming a package includes forming a waveguide radiation receiver in a first conductor layer of a multilayer package substrate, the multilayer package substrate comprising the first conductor layer spaced from a second conductor layer by a dielectric layer, forming a feed line coupling the waveguide radiation receiver to a transmitter-receiver the feed line including a conductive via traversing the dielectric layer electrically coupling a first portion of the feed line in the first conductor layer to a second portion of the feed line in the second conductor layer, the first portion adjacent the waveguide radiation receiver, and the second portion adjacent the transmitter-receiver, and mounting a tubular waveguide to the multilayer package substrate such that a central aperture of the tubular waveguide is over the waveguide radiation receiver.

DETAILED DESCRIPTION

Figure 1A:
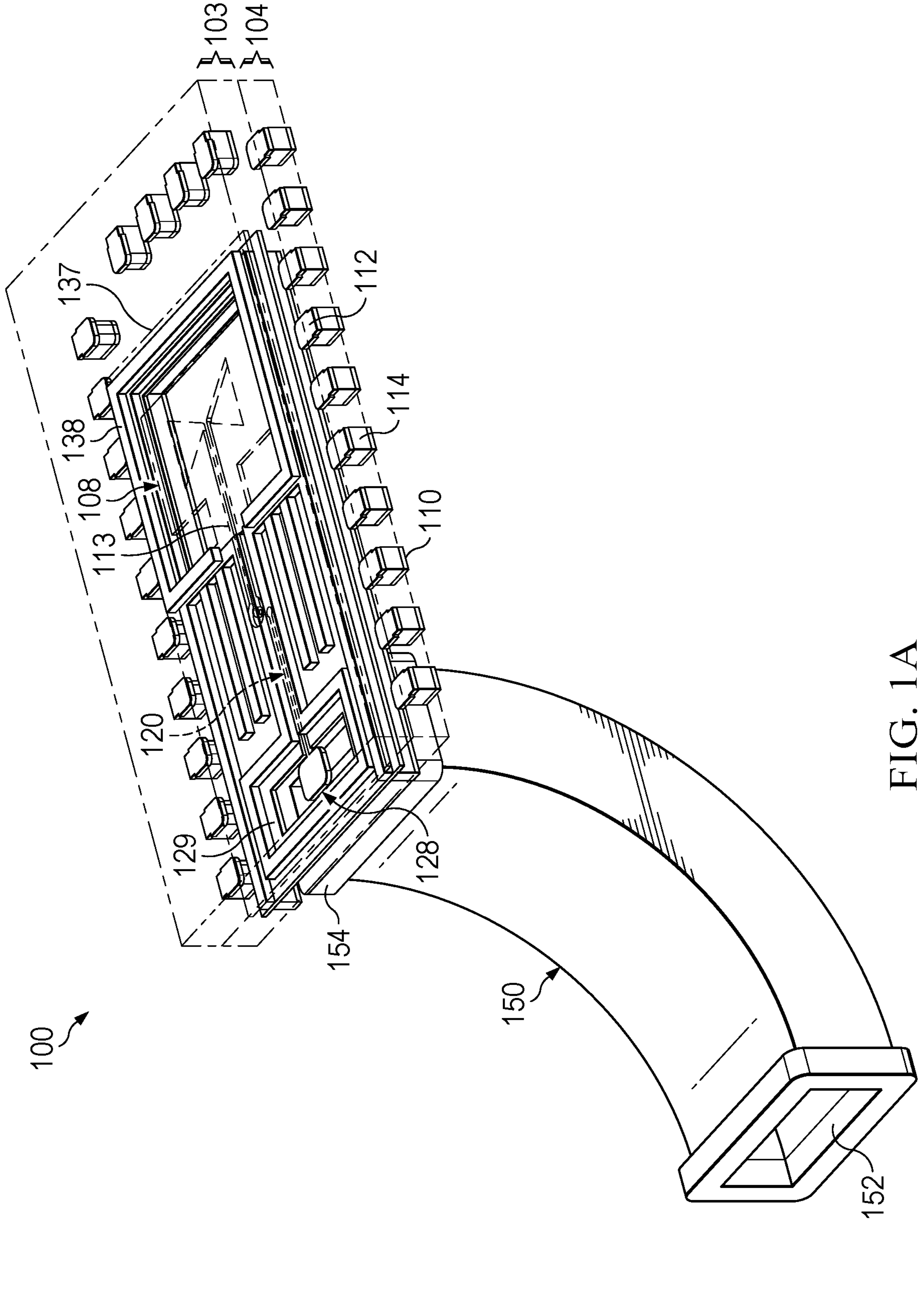
FIGS. 1A and 1B illustrate a semiconductor package with a multilayer package substrate with an integrated antenna and a curved tubular waveguide mounted to the package substrate.

Corresponding numerals and symbols in the different figures generally refer to corresponding parts, unless otherwise indicated. The figures are not necessarily drawn to scale.

Elements are described herein as “coupled.” The term “coupled” includes elements that are directly connected and elements that are indirectly connected, and elements that are electrically connected even with intervening elements or wires are coupled.

The term “semiconductor die” is used herein. A semiconductor die can be a discrete semiconductor device such as a bipolar transistor, a few discrete devices such as a pair of power FET switches fabricated together on a single semiconductor die, or a semiconductor die can be an integrated circuit with multiple semiconductor devices such as the multiple capacitors in an A/D converter. The semiconductor die can include passive devices such as resistors, inductors, filters, sensors, or active devices such as transistors. The semiconductor die can be an integrated circuit with hundreds or thousands of transistors coupled to form a functional circuit, for example a microprocessor or memory device.

The term “microelectronic package” is used herein. A microelectronic package has at least one electronic component, such as an antenna or semiconductor die electrically coupled to terminals, and has a package body that protects and covers the electronic component. The microelectronic package can include additional elements, in some arrangements an integrated antenna is included. Passive components such as capacitors, resistors, and inductors or coils can be included. In some arrangements, multiple semiconductor dies can be packaged together. For example, a power metal oxide semiconductor (MOS) field effect transistor (FET) semiconductor die and a logic semiconductor die (such as a gate driver die or a controller die) can be packaged together to from a single packaged electronic device. The electronic component is mounted to a package substrate that provides conductive leads, a portion of the conductive leads form the terminals for the packaged device. The electronic component can be mounted to the package substrate with a device side surface facing away from the substrate and a backside surface facing and mounted to a die pad of the package substrate. In wire bonded semiconductor device packages, bond wires couple conductive leads of a package substrate to bond pads on the electronic component. The semiconductor device package can have a package body formed by a thermoset epoxy resin in a molding process, or by the use of epoxy, plastics, or resins that are liquid at room temperature and are subsequently cured. The package body may provide a hermetic package for the packaged device. The package body may be formed in a mold using an encapsulation process, however, a portion of the leads of the package substrate are not covered during encapsulation, these exposed lead portions provide the terminals for the semiconductor device package.

The term "package substrate" is used herein. A package substrate is a substrate arranged to receive a semiconductor die and to support the semiconductor die in a completed semiconductor device package. Package substrates useful with the arrangements include conductive lead frames, which can be formed from copper, aluminum, stainless steel, steel and alloys such as Alloy 42 and copper alloys. The lead frames can include a die pad with a die side surface for mounting a semiconductor die, and conductive leads arranged near and spaced from the die pad for coupling to bond pads on the semiconductor die using wire bonds, ribbon bonds, or other conductors. The lead frames can be provided in strips or arrays. The conductive lead frames can be provided as a panel with strips or arrays of unit device portions in rows and columns. Semiconductor dies can be placed on respective unit device portions within the strips or arrays. A semiconductor die can be placed on a die pad for each packaged device, and die attach or die adhesive can be used to mount the semiconductor dies to the lead frame die pads. In wire bonded packages, bond wires can couple bond pads on the semiconductor dies to the leads of the lead frames. The lead frames may have plated portions in areas designated for wire bonding, for example silver plating can be used. After the bond wires are in place, a portion of the package substrate, the semiconductor die, and at least a portion of the die pad can be covered with a protective material such as a mold compound.

The term "multilayer package substrate" is used herein. A multilayer package substrate is a substrate that has multiple conductor levels including conductive traces, and which has vertical conductive connections extending through the dielectric material between the conductor levels. In an example arrangement, a routable lead frame (RLF) is formed by plating a patterned conductor level and then covering the conductor with a layer of dielectric material. Grinding can be performed on the dielectric material to expose portions of the layer of conductors. Additional plating layers can be formed to add additional levels of conductors, some of which are coupled to the prior layers by vertical connectors, and additional dielectric material can be deposited at each level and can cover the conductors. By using an additive or build up manufacturing approach, and by performing multiple plating steps, molding steps, and grinding steps, a multilayer package substrate is formed with an arbitrary number of layers. In an example arrangement, copper conductors are formed by plating, and a thermoplastic material can be used as the dielectric material.

In packaging microelectronic and semiconductor devices, mold compound may be used to partially cover a package substrate, to cover components, to cover a semiconductor die, and to cover the electrical connections from the semiconductor die to the package substrate. This molding process can be referred to as an "encapsulation" process, although some portions of the package substrates are not covered in the mold compound during encapsulation, for example terminals and leads are exposed from the mold compound. Encapsulation is often a compressive molding process, where thermoset mold compound such as resin epoxy can be used. A room temperature solid or powder mold compound can be heated to a liquid state and then molding can be performed by pressing the liquid mold compound into a mold through runners or channels. Transfer molding can be used. Unit molds shaped to surround an individual device may be used, or block molding may be used, to form multiple packages simultaneously for several devices from mold compound. The devices to be molded can be provided in an array or matrix of several, hundreds or even thousands of devices in rows and columns that are then molded together.

After the molding, the individual packaged devices are cut from each other in a sawing operation by cutting through the mold compound and package substrate in saw streets formed between the devices. Portions of the package substrate leads are exposed from the mold compound package to form terminals for the packaged semiconductor device.

The term "quad flat no-lead" (QFN) is used herein for a type of leadless electronic device package. A QFN package has conductive terminals that are coextensive with the sides of a molded package body, and in a quad package the terminals are on four sides. Alternative flat no-lead packages may have terminals on two sides or only on one side. These can be referred to as small outline no-lead or SON packages. No-lead packaged electronic devices can be surface mounted to a board. Leaded packages can be used with the arrangements where the leads extend away from the package body and are shaped to form a portion for soldering to a board. A dual in line package (DIP) can be used with the arrangements. A small outline package (SOP) can be used with the arrangements. Small outline no-lead (SON) packages can be used, and a small outline transistor (SOT) package is a leaded package that can be used with the arrangements. Leads for leaded packages are arranged for solder mounting to a board. The leads can be shaped to extend towards the board, and form a mounting surface. Gull wing leads, J-leads, and other lead shapes can be used. In a DIP package, the leads end in pin shaped portions that can be inserted into conductive holes formed in a circuit board, and solder is used to couple the leads to the conductors within the holes.

The term "patch antenna" is used herein. A patch antenna is a planar conductor in a rectangular, square, circular, oval, triangular, or other geometrically shaped sheet or "patch" of material mounted over and spaced from a ground plane. In the arrangements, a patch antenna is formed of a first conductor layer in a multilayer package substrate, and a ground reflector is formed of a lower layer of conductor in the multilayer package substrate to reflect signals from the patch antenna back to the patch antenna. The patch antenna and the ground reflector are spaced by dielectric material of the package substrate.

The term "waveguide" is used herein. A waveguide is a waveguide is a structure that guides electromagnetic waves by restricting the direction of energy transmission.

The term "waveguide radiation receiver (WRR)" is used herein. A WRR is a patch antenna configured for alignment with a waveguide to translate TE/EM signals within the waveguide to TEM signals within the patch antenna.

In the arrangements, a microelectronic package includes a tubular waveguide mounted to a multilayer package substrate. The multilayer package substrate has a device side surface, a waveguide mounted on a portion of the device side surface, and a patch antenna formed spaced from the die portion. In an example arrangement the semiconductor die will be mounted beside, or side by side, with respect to a patch antenna formed on the device side surface. In the multilayer package substrate, the patch antenna can be formed in a conductive layer at or near the device side surface of the multilayer package substrate, for example as a patterned plated conductor layer of the multilayer package substrate. A waveguide mounted to the device side surface of the multilayer package substrate can be coupled to the patch antenna by conductive traces formed in conductor layers of the multilayer package substrate. In one example, the semiconductor die is flip chip mounted to the multilayer package substrate.

In an example arrangement, a patch antenna is configured to operate in the rectangular waveguide 5 (WR5) frequency range, between 140 GHz and 220 GHz. In other examples, the patch antenna can be configured to operate in the millimeter wave range between 30 GHz and 300 GHz, with signals having wavelengths in air between 10 millimeters and 1 millimeters. Other frequency signals such as RF signals can be transmitted or received by the antenna. In one example arrangement, the patch antenna is a patch antenna. In the arrangements, a planar layer of conductor in the multilayer package substrate is patterned to form a patch antenna and the corresponding feed line, and a planar reflector, spaced from the patch antenna by dielectric material, is formed to reflect radiated energy from the patch antenna back to the patch antenna, to increase the transmitted energy.

The semiconductor die used in the arrangements can be a monolithic millimeter wave integrated circuit (MMIC). The MMIC can be a transmitter, receiver, transceiver, or a component in a system for transmitting or receiving signals such as an amplifier, encoder, filter, or decoder. The semiconductor die can be provided as multiple semiconductor dies or as components mounted to the multilayer package substrate, to form a system. Additional passive components can be mounted to the multilayer package substrate.

Figure 1B:
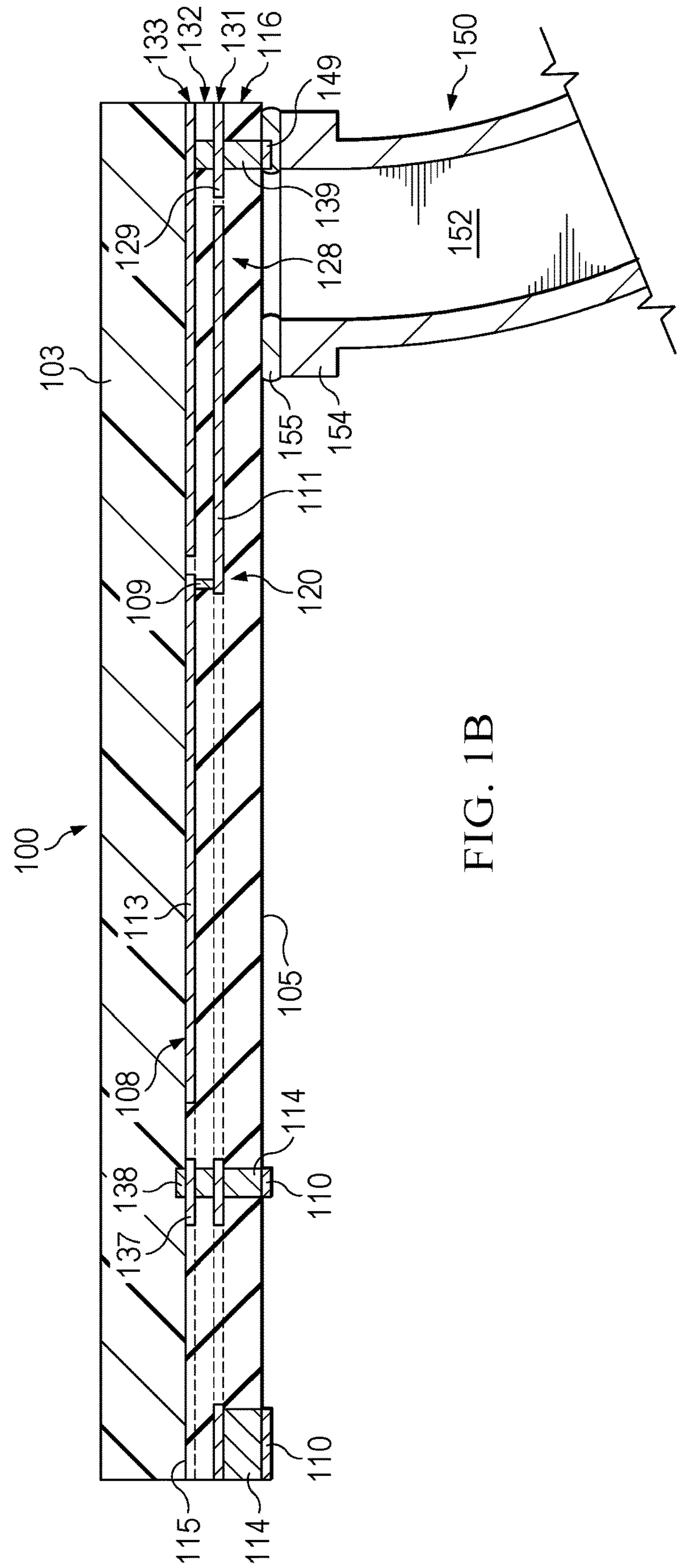

FIGS. 1A and 1B illustrate a microelectronic package 100, an example arrangement using a quad flat no lead (QFN) package. In particular, FIG. 1A is a perspective view of package 100, and FIG. 1B is a conceptual cut-away view of package 100. QFN packages are one type of package that is useful with the arrangements. Other package types including leaded and other no lead packages can be used. The microelectronic package 100 includes a multilayer package substrate 104 with a waveguide radiation receiver 128 and a patch antenna 108, and a tubular waveguide 150 mounted over the waveguide radiation receiver 128. Patch antenna 108 is electrically connected to waveguide radiation receiver 128 via multilayer package substrate 104 and represents the transmitter-receiver of microelectronic package 100. Patch antenna 108 may relay signals to and from waveguide radiation receiver 128 wirelessly to a remote device. In some examples, microelectronic package 100 is suitable for testing performance of multilayer package substrate 104 with a waveguide radiation receiver 128 and tubular waveguide 150 without the complexity of a microelectronic package 100 including a semiconductor die.

Multilayer package substrate 104 includes dielectric layer 132 and electrical conductors formed on and within dielectric layer 132. The electrical conductors of multilayer package substrate 104 include a first conductor layer 131 on a board side surface 105 (the bottom surface as the arrangement is oriented in FIG. 1B) of the multilayer package substrate 104, second conductor layer 133 on a topside surface 115 (the top surface as the arrangement is oriented in FIG. 1B), and vertical connectors 109, which extend within dielectric layer 132.

The first conductor layer 131 forms the waveguide radiation receiver 128. The second conductor layer 133 forms the patch antenna 108. A feed line 120 of conductors couples the waveguide radiation receiver 128 to the patch antenna 108. The feed line 120 includes a conductive via 109 traversing the dielectric layer 132 electrically coupling a first portion 111 of the feed line 120 in the first conductor layer 131 to a second portion 113 of the feed line 120 in the second conductor layer 133, the first portion 111 adjacent the waveguide radiation receiver 128, and the second portion 113 adjacent the patch antenna 108.

The waveguide radiation receiver 128 is a planar patch antenna formed of the first conductor layer 131 on the bottom surface 105 of the multilayer package substrate 104. The waveguide radiation receiver 128 patch antenna includes a conductive probe adjacent the central aperture 152 of the tubular waveguide 150 and a planer ring ground plane 129 surrounding a profile of the central aperture 152. The conductive probe is formed as a rectangular pattern in the first conductor layer 131. In an example arrangement, the rectangular pattern of the conductive probe has a length of between 100 to 500 micrometers and a width of between 100 to 500 micrometers. In the same or different example arrangement, corners of the rectangular pattern of the conductive probe form chamfers with a radius in a range of 10 to 150 micrometers.

Patch antenna 108 serves as a transmitter-receiver for microelectronic package 100. The patch antenna is formed as a rectangular pattern in the second conductor layer 133, the rectangular pattern having a width of between 1 and 4 millimeters and having a length of between 1 and 4 millimeters. The patch antenna 108 includes a planar antenna formed of the second conductor layer 133 in a bow-tie shape with a planer ring ground plane 129. In other arrangements, a different shape may be use for patch antenna 108, such as rectangular, square, circular, oval, triangular, or other geometrically shaped sheet or "patch" of material mounted over and spaced from ground plane 129. An elevated ground ring 138 is formed with an elevated trace over the planer ring ground plane 137 of the second conductor layer 133.

The dielectric layer 132 of the multilayer package substrate 104 can be a thermoplastic or a thermoset material. An example thermoplastic material is ABS (Acrylonitrile Butadiene Styrene). Alternative dielectric materials include thermoplastics such as ASA (Acrylonitrile Styrene Acrylate), thermoset mold compound including epoxy resin, epoxies, resins, or plastics. A mold compound 103 is shown overlying the antenna 108. Mold compound 103 can be a thermoset mold compound of epoxy resin, another epoxy, a resin, or plastic.

The example patch antenna 108 and waveguide radiation receiver 128 are configured for radiating signals in the rectangular waveguide WR5 range, between 140 and 220 GHz. In alternative arrangements, the waveguide radiation receiver 128 can be varied in dimensions to configure its patch antenna for other frequency ranges, for example between 30 GHz and 300 GHz (millimeter wave).

The tubular waveguide 150 is mounted to the multilayer package substrate 104 such that a central aperture 152 of the tubular waveguide 150 is over the waveguide radiation receiver 128. While specific dimensions for tubular waveguide 150 should be selected according to waveguide properties required for a particular application, including directionality, gain and filtering, useful sizes for an example of central aperture the tubular waveguide 150 could be from 1.5 to 4 millimeters by 1.5 to 4 millimeters, for example. A length, either curved or straight of the tubular waveguide 150, could be from 4 to 25 millimeters. The tubular waveguide 150 may be formed from a metal material, such as an extruded, cast, machined or stamped metal, such as steel, copper, gold, silver, aluminum or an alloy thereof. The waveguide 150 provides a straight extruded rectangular profile, although a curved extruded rectangular profile may also be used. A solder connection 155 is between the tubular waveguide 150 and the multilayer package substrate 104, mechanically coupling a flange 154 of tubular waveguide 150 to the multilayer package substrate 104. The solder connection 155 also provides an electrical connection to a ground plane 129 surrounding the waveguide radiation receiver 128.

For the QFN package 100, terminals 110 are formed of the first conductor layer 131 on the board side surface 105. Vertical connectors 114 extend from terminals 110 through layers of dielectric material of the multilayer package substrate 104 and coplanar with board side surface 105, where leads 112 are formed of conductors of a second conductor layer 133 of the multilayer package substrate 104 and coplanar with topside surface 115. Similarly, vertical connector 139 extends from the ground plane 129 through electrically insulating layer 116 to a partial ring 149 configured to receive the solder connection 155 to flange 154 of tubular waveguide 150. For example, the exposed portions of terminals 110 and partial ring 149 may be formed from a plated layer, such as copper, gold, silver, aluminum or an alloy thereof. In some arrangements, vertical connectors 114, 139 represent a common built-up layer over the first conductor layer 131.

In FIG. 1A, the microelectronic package 100 is illustrated in a projection view and includes mold compound 103 covering the topside surface 115 of the multilayer package substrate 104 and patch antenna 108. Terminals 110 on the board side surface 105 are configured for mounting to a system board, for example a printed circuit board. In such an example, the system board may include an aperture that allows waveguide 150 to extend to the other side of the printed circuit board. Leads 112 are formed on the topside surface 115 of the multilayer package substrate 104 can be formed of the same material as waveguide radiation receiver 128, for example, copper, gold, aluminum, silver, or an alloy of these. Protective plating layers such as palladium, nickel, gold or multiple layers of these can be form on the waveguide radiation receiver 128.

Although not shown in the illustration for simplicity of explanation, additional components such as passives or semiconductor devices including sensors or filters can be mounted to the topside surface 115 of the multilayer package substrate 104. Leads 112 are formed on the topside surface of the multilayer package substrate 104 and couple the components to vertical connectors 114, which are conductors formed of the intervening conductor layers of the multilayer package substrate 104 that extend through dielectric material to the terminals 110.

The conductive probe of the patch antenna of waveguide radiation receiver 128 is a patterned conductor material that is coupled to a portion 111 of feed line 120 also formed in the first conductor layer 131. While the probe rectangular, circular, triangular, oval and other shapes can be used for the patch antenna. The patch antenna 108 can be formed of the second conductor layer on the device side of the multilayer package substrate 104, for example patch antenna 108 can be formed of copper or gold or alloys. Other conductive materials compatible with plating processes can be used, including silver and aluminum. The patch antenna 108 are formed in another conductor layer of the multilayer package substrate 104, and can be formed of the same material or another conductor material, for example patch antenna 108 can be formed of copper or gold.

Useful sizes for an example of the multilayer package substrate 104 could be from 2 to 7 millimeters by 2 to 7 millimeters, for example. The size of the multilayer package substrate can be varied depending on the size and number of semiconductor devices mounted, as well as the patch antenna dimensions, so that the area of the topside surface 115 is sufficient for mounting the patch antenna 108 with the waveguide radiation receiver 128 spaced from the patch antenna 108 on the board side surface 105. In other examples, the waveguide radiation receiver 128 may overlap the patch antenna 108. As frequencies increase, the wavelengths become compatible with microelectronics package sizes, for example millimeter wave signals between 30 and 300 GHz have wavelengths of between 1 and 10 millimeters. The patch antenna of the waveguide radiation receiver 128 takes advantage of these sizes. As the transmit and receive frequencies increase and wavelengths correspondingly decrease, the size of the patch antenna of the waveguide radiation receiver 128 may decrease, and the useful sizes of the multilayer package substrate 104 may also decrease. The arrangements are useful in implementing antennas with millimeter wave frequencies and 5G standard frequencies, for example.

The microelectronic package 100 can be formed using additive manufacturing, or build up processing, to form the multilayer package substrate including the patch antenna 108 and the waveguide radiation receiver 128. As is further described below, by using a series of plating, molding, and grinding steps, successive layers of trace level conductors, vertical connections, and dielectric can be formed, and these steps can be repeated to form the multilayer package substrate 104. The waveguide radiation receiver 128 can be formed by forming a pattern on a rectangular portion of the first conductor layer 131, and the patch antenna 108 can be formed by forming a pattern on a rectangular portion of the second conductor layer 133. By mounting the waveguide 150 on the multilayer package substrate 104 over the waveguide radiation receiver 128 using a solder connection 155, a reliable and cost-effective microelectronic package 100 including a waveguide 150 is provided by use of the arrangements.

Figure 2:
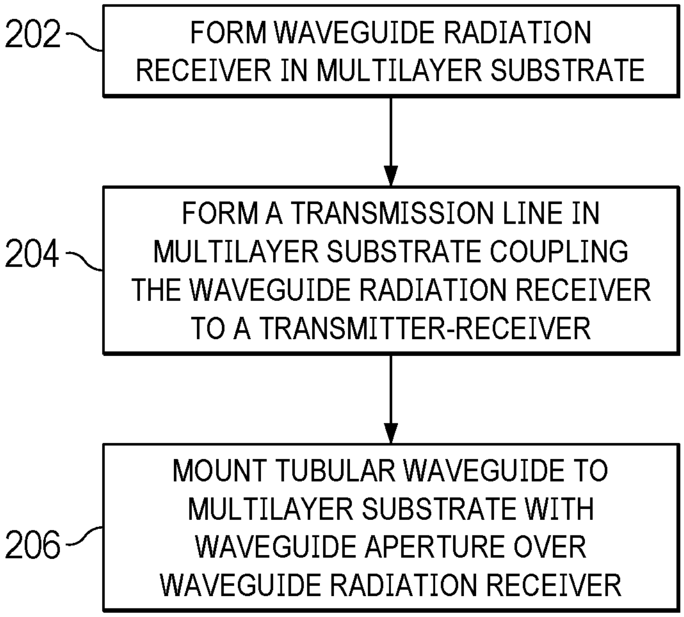
FIG. 2 is a flowchart of a method of manufacturing a semiconductor package with multilayer package substrate with an integrated antenna and a tubular waveguide mounted to the package substrate, such as the semiconductor package of FIGS. 1A and 1B.

FIG. 2 is a flowchart of a method of manufacturing a semiconductor package including multilayer package substrate with a waveguide radiation receiver and a tubular waveguide, such as package 100 of FIGS. 1A and 1B. For clarity, the techniques of FIG. 2 are described with respect to package 100 and FIGS. 1A and 1B; however, the described techniques may also be utilized in the manufacture of other semiconductor packages, including package 500 of FIGS. 5A and 5B.

During the manufacture of a package including multilayer package substrate with a waveguide radiation receiver and a tubular waveguide, such as package 100 with multilayer package substrate 104, the multilayer package substrate 104, including first conductor layer 131, second conductor layer 133, and dielectric layer 132 with vertical connectors 109, is formed on a carrier, such as a glass or metal carrier. An adhesive, such as thermal or UV sensitive adhesive, may hold the first layer to the carrier, such as electrically insulating layer 116, or first conductor layer 131 during the formation of multilayer package substrate 104. In order to form multilayer package substrate 104, patterned metal layers may be alternated with dielectric layers on the carrier. Vertical connectors 109, 139 may be formed within the dielectric layers by drilling (either mechanical or laser drilling) to create voids, followed by filling the voids with metal, for example, by electroplating or sputtering.

Forming multilayer package substrate 104 includes forming a waveguide radiation receiver 128 in the first conductor layer 131 (FIG. 2, step 202). Forming the waveguide radiation receiver 128 may include plating the first conductor layer 131 on a seed layer, the first conductor layer 131 comprising copper, gold silver, aluminum or an alloy thereof.

Forming multilayer package substrate 104 further includes forming a feed line 120 coupling the waveguide radiation receiver 128 to a transmitter-receiver, such as patch antenna 108 or semiconductor die 502 (FIG. 2, step 204). The feed line 120 includes a conductive via 109 traversing the dielectric layer 132 electrically coupling a first portion 111 of the feed line 120 in the first conductor layer 131 to a second portion 113 of the feed line 120 in the second conductor layer 133, the first portion adjacent the waveguide radiation receiver 128, and the second portion adjacent the patch antenna 108, the transmitter-receiver of package 100.

Forming the feed line 120 may include applying dielectric layer 132 over the first conductor layer 131, drilling dielectric layer 132 and filling with metal to form the vertical connector 109, and plating the second conductor layer 133 on a seed layer over dielectric layer 132. Forming the second conductor layer 133 also includes forming patch antenna 108 as well as electrical contacts for any active or passive components, such as die attach contacts 522.

The multilayer package substrate 104 may then be removed from the carrier to facilitate the attachment of tubular waveguide 150 to the multilayer package substrate 104. For example, mounting a tubular waveguide 150 to the multilayer package substrate 104 includes aligning the central aperture 152 of the tubular waveguide 150 over the waveguide radiation receiver 128 (FIG. 2, step 206). Mounting the tubular waveguide 150 to the multilayer package substrate 104 includes soldering the tubular waveguide 150 to the first conductor layer 131 at a ground plane 129 surrounding a profile of the central aperture 152. Specifically, the flange 154 is soldered to partial ring 149 of multilayer package substrate 104 to form solder connection 155, electrically and mechanically connecting tubular waveguide 150 to the partial ring 149, which is electrically connected to ground plane 129.

In some examples, package 100 may be manufactured as part of a set of at least two packages formed in unison as a panel on a common carrier. For example, multilayer package substrate 104 may be formed as part of an array of multilayer package substrates, and active and passive components, if any, may be attached to topside surfaces 115 of the array of multilayer package substrates in unison.

Following the assembly of multilayer package substrate 104, and the active and passive components, mold compound 103 is molded over topside surfaces 115, including patch antenna 108 and any active and passive components. Molding may occur either prior to after multilayer package substrate 104 is removed from the carrier.

Following the molding of mold compound 103, the array of packages 100 may be singulated, for example, by cutting within interconnected portions of the array of multilayer package substrates 104. Sawing may include cuts along a grid such that each package 100 has a rectangular profile. The tubular waveguides 150 may be mounted in union to the array of packages 100, or may be mounted to individual packages 100 after singulation.

Figure 3A:
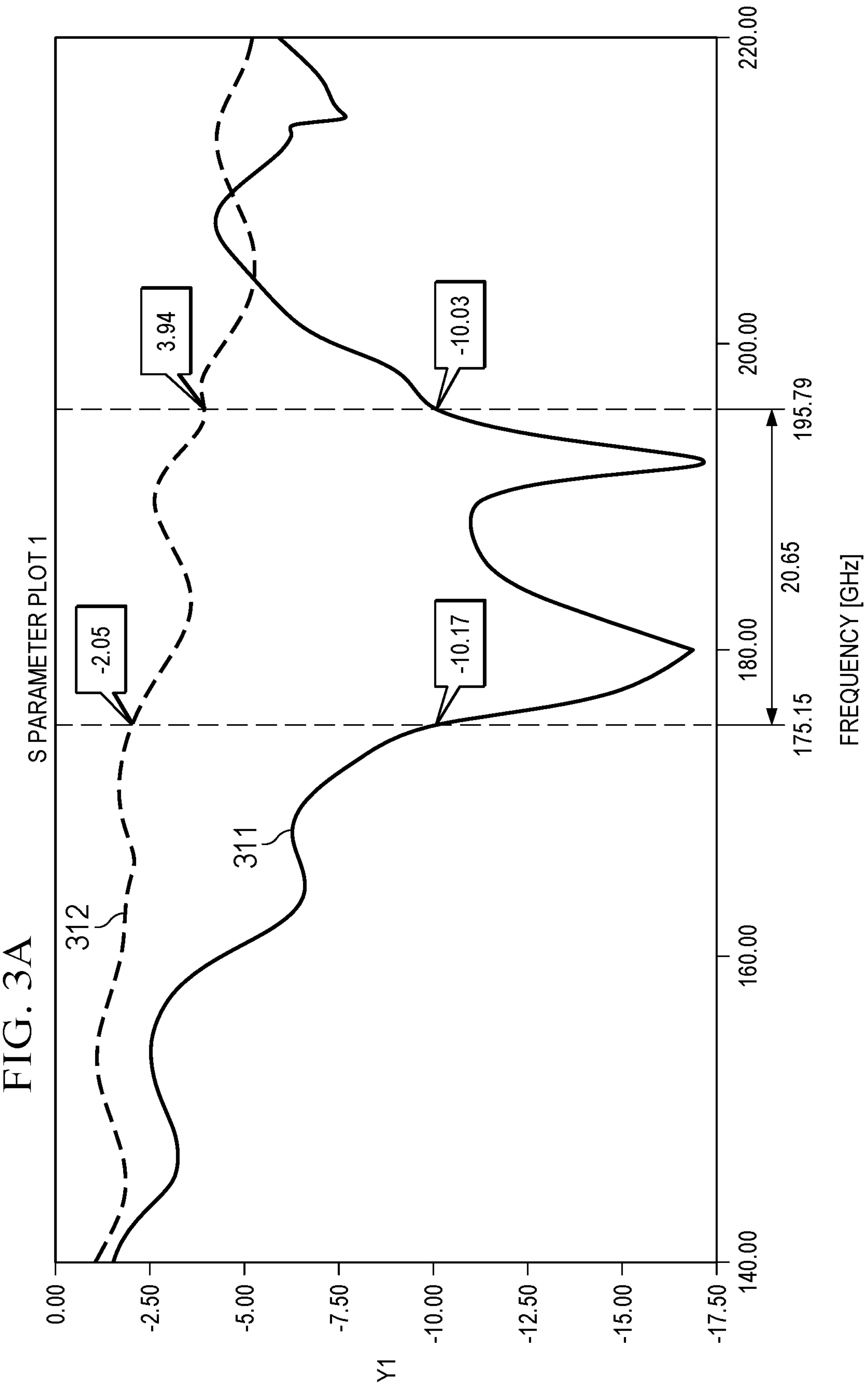
FIGS. 3A and 3B illustrates, in graphs, S parameter performances of different arrangements.
Figure 3B:
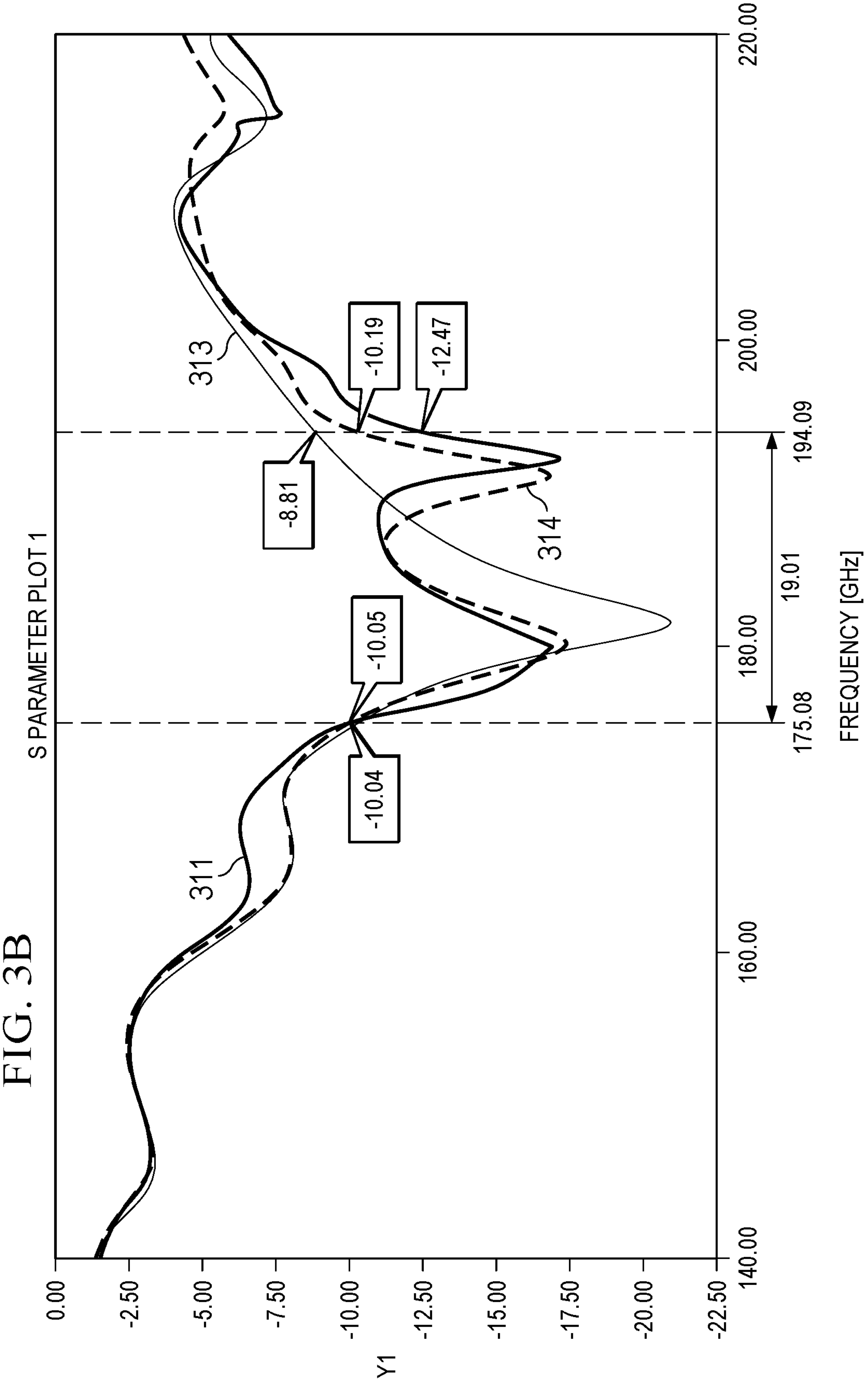

FIGS. 3A and 3B illustrate, in a graph, S11 parameters for various arrangements. In particular, FIG. 3A illustrates the S11 parameters for the example patch antenna of waveguide radiation receiver 128 including a rectangular probe as curve 311, and illustrates the S11 parameters for the example patch antenna of waveguide radiation receiver 128 modified without the rectangular probe as curve 312. The S11 curve 311 is below −10 dB along the frequency range from 175 GHz to about 196 GHz, indicating low reflection and good insertion performance for the waveguide radiation receiver 128 with the probe in the WR5 frequency range. In contrast, the S11 curve 312, for the waveguide radiation receiver without the rectangular probe is between −2 dB and −4 dB along the frequency range from 175 GHz to about 196 GHZ, an unacceptable performance.

Figure 5A:
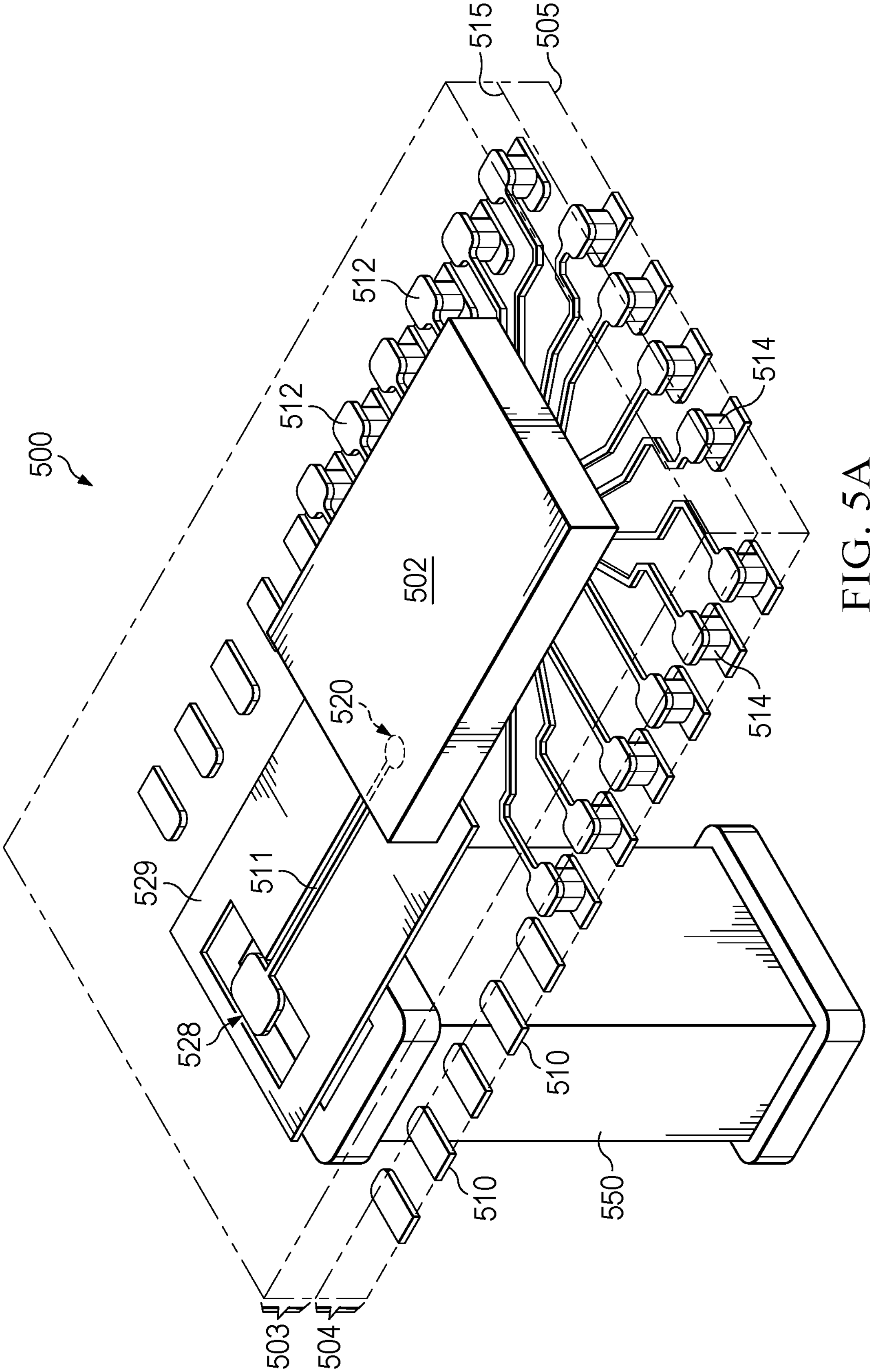
FIGS. 5A and 5B illustrate a semiconductor package with semiconductor die, a multilayer package substrate with an integrated antenna, and a tubular waveguide mounted to the package substrate.

FIG. 3B illustrates the S11 parameters for the example patch antenna of waveguide radiation receiver 128 including a rectangular probe and curved tubular waveguide 150 as curve 311, and illustrates the S11 parameters of an alternative arrangement as curve 313. The alternative arrangement is the same as package 100 including a rectangular probe, but with the curved tubular waveguide 150 is replaced with a straight tubular waveguide, such as waveguide 550 (FIG. 5A). The S11 curves 311, 313 are both below −9 dB along the frequency range from 175 GHz to about 194 GHz, indicating low reflection and good insertion performance for the waveguide radiation receiver 128 with the probe in the WR5 frequency range. Both curves 311, 313 compare favorably with a conceptual idea case with a de-embded waveguide, as shown on S11 curve 314.

FIGS. 4A-4E are graphs of simulations showing a radiation pattern for the example patch antenna of waveguide radiation receiver 128 including a rectangular probe. The radiation patterns of FIGS. 4A-4E indicate acceptable directional performance at frequencies of 150, 160, 170, 180 and 190 GHz for both vertical and horizontal radiation patterns.

Figure 4A:
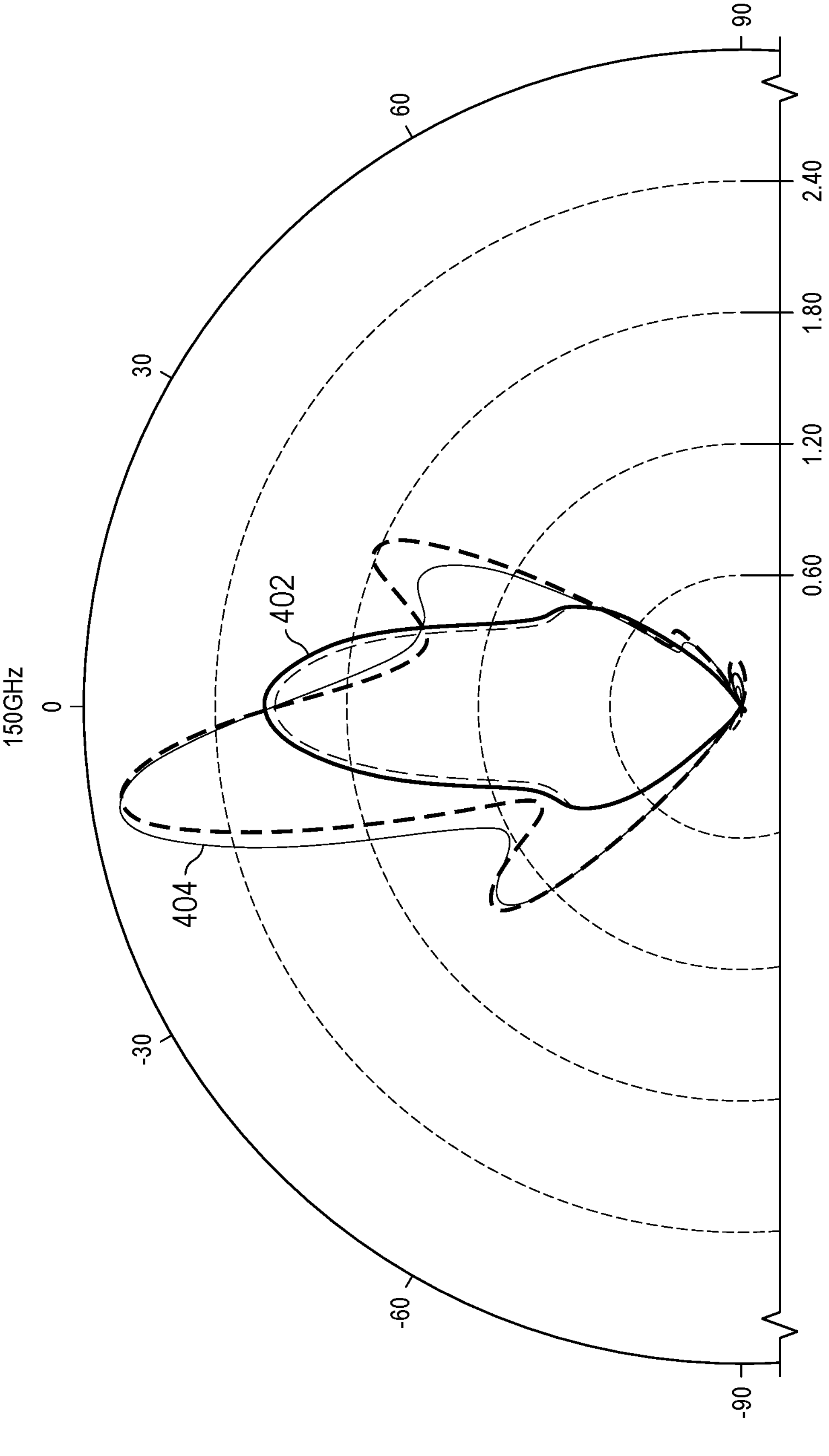
FIGS. 4A-4E illustrate, in graphs, the radiated field patterns of the antenna arrangement of FIGS. 1A and 1B.

As shown in FIG. 4A, for a frequency of 150 GHz, the vertical radiation pattern of the antenna indicated by curve 402 has a major lobe extending from package upwards, as is desired for the arrangements. The horizontal radiation pattern of the antenna indicated by curve 404 has a major lobe extending from package at −10 degrees, which is within acceptable limits.

Figure 4B:
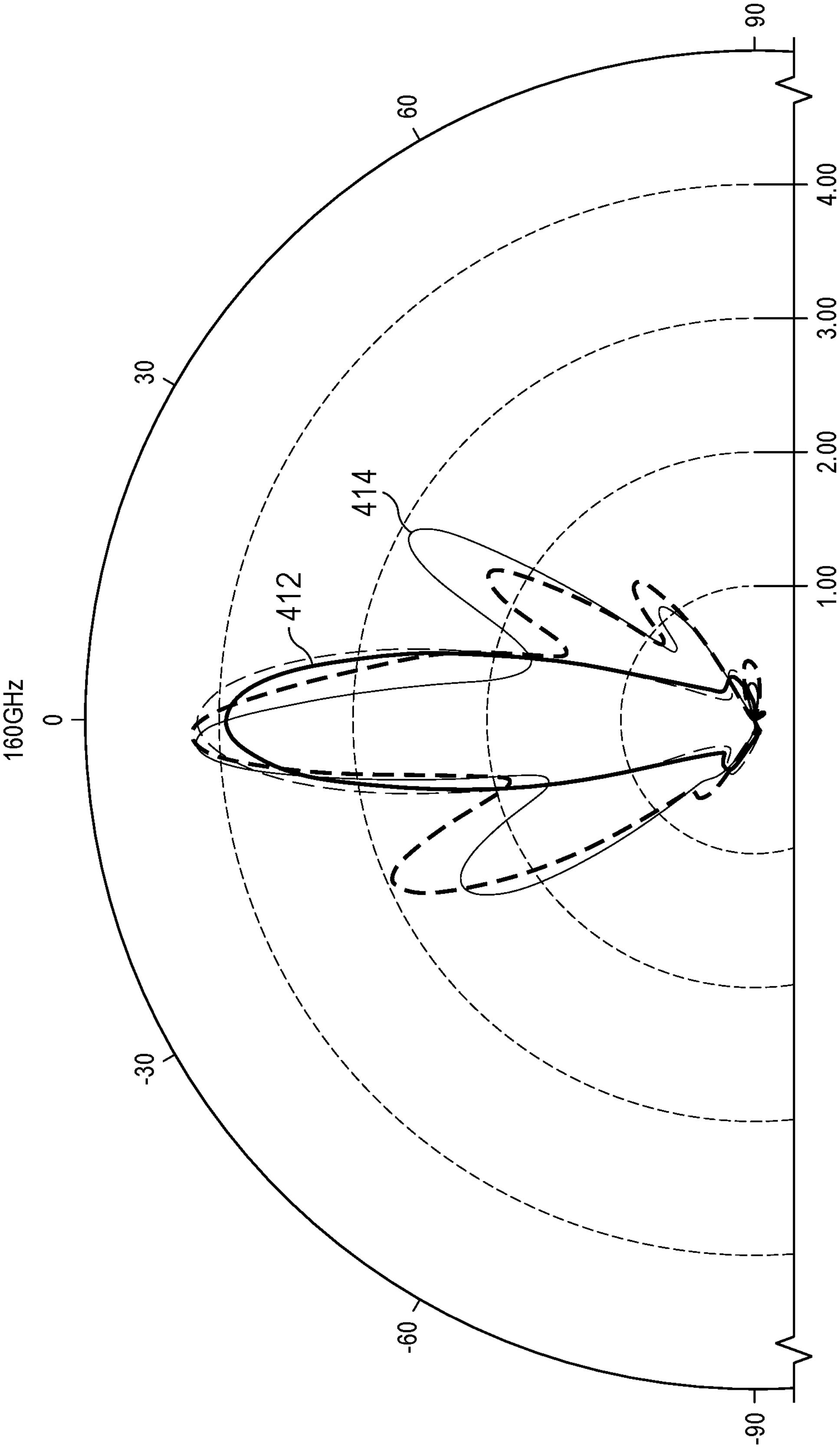

As shown in FIG. 4B, for a frequency of 160 GHz, the vertical radiation pattern of the antenna indicated by curve 412 has a major lobe extending from package upwards, as is desired for the arrangements. The horizontal radiation pattern of the antenna indicated by curve 414 also has a major lobe extending from package upwards, as is desired for the arrangements.

Figure 4C:
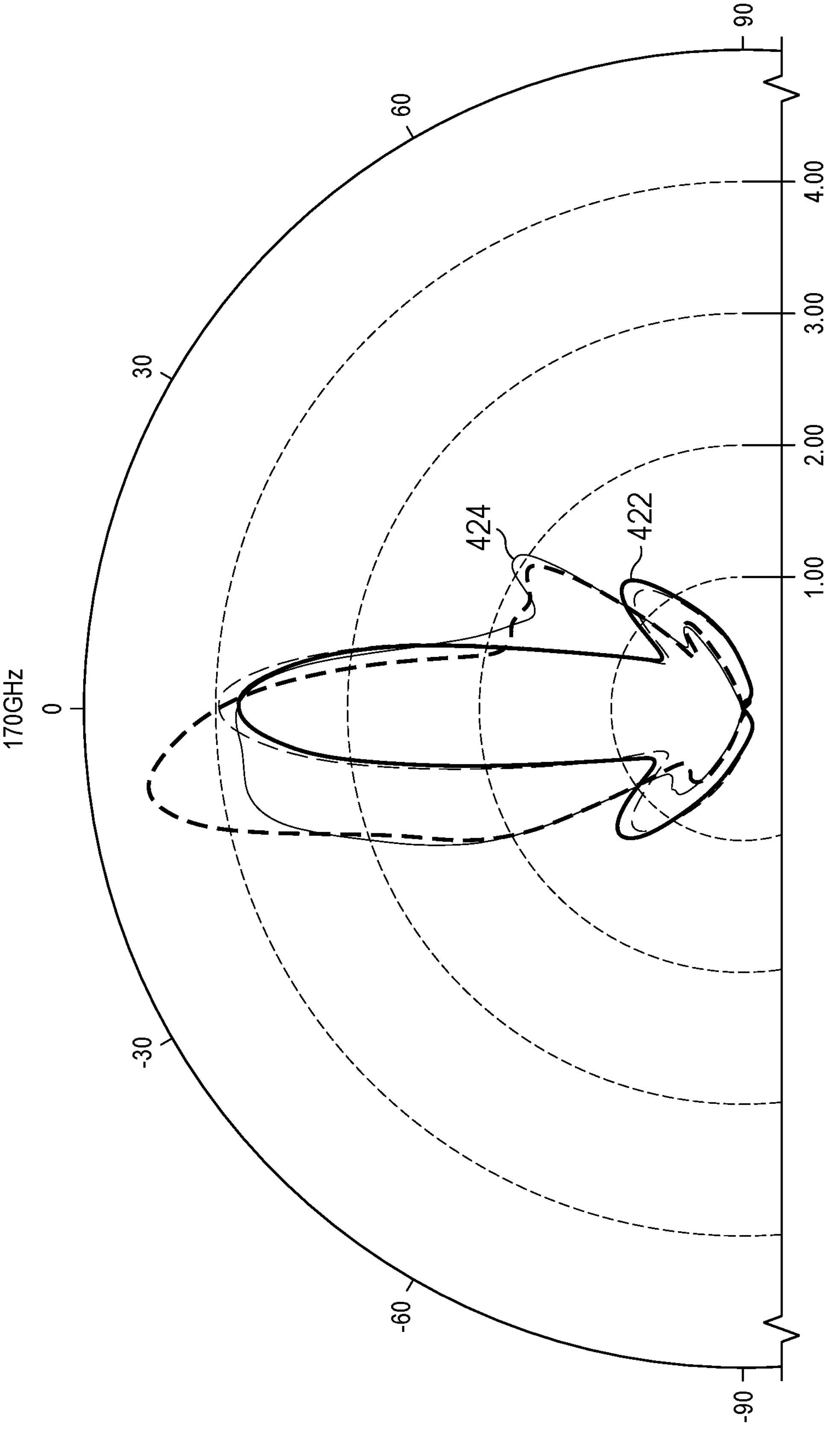

As shown in FIG. 4C, for a frequency of 170 GHz, the vertical radiation pattern of the antenna indicated by curve 422 has a major lobe extending from package upwards, as is desired for the arrangements. The horizontal radiation pattern of the antenna indicated by curve 424 has a major lobe extending from package at −10 degrees, which is within acceptable limits.

Figure 4D:
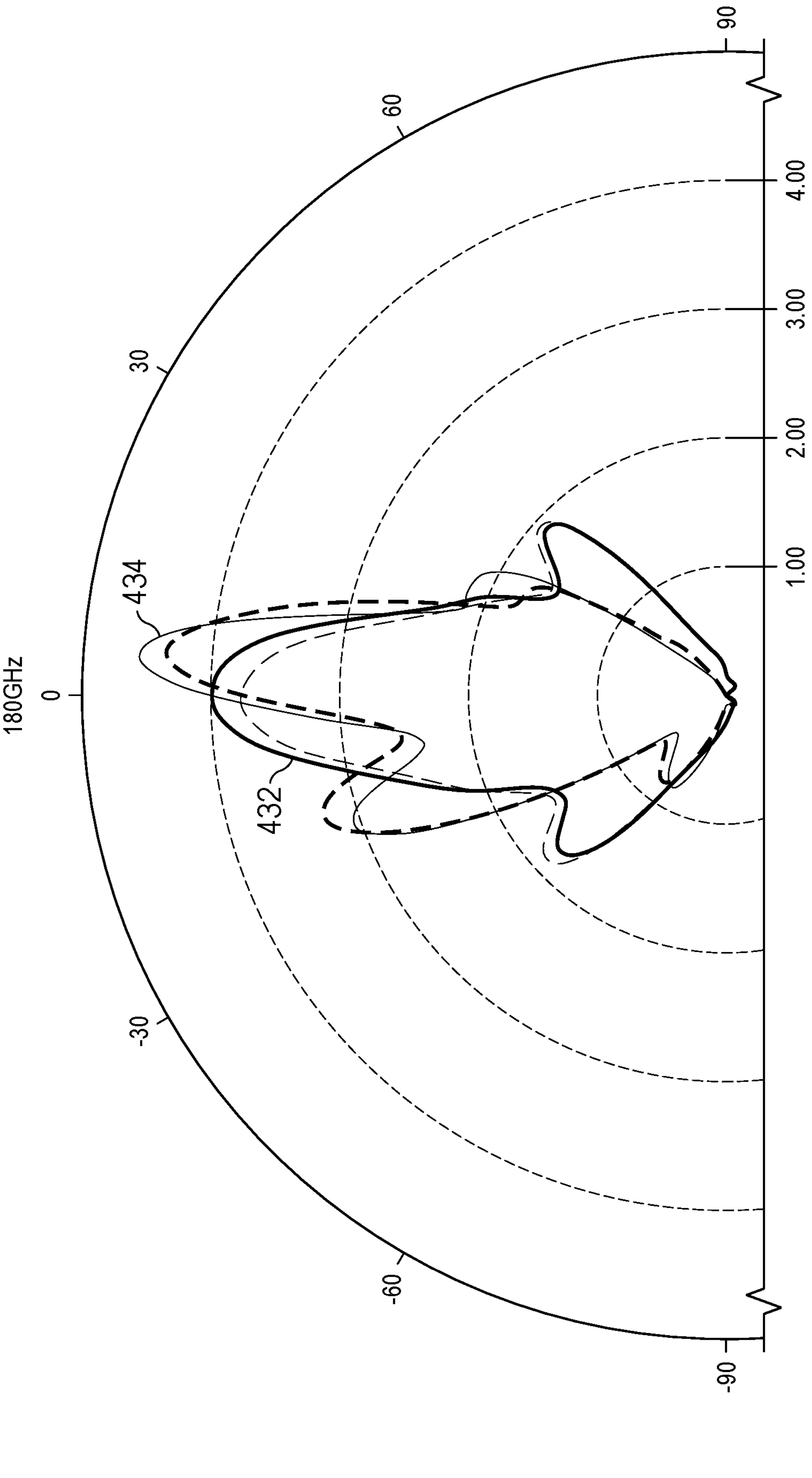

As shown in FIG. 4D, for a frequency of 180 GHz, the vertical radiation pattern of the antenna indicated by curve 432 has a major lobe extending from package upwards, as is desired for the arrangements. The horizontal radiation pattern of the antenna indicated by curve 434 also has a major lobe extending from package upwards at +5 degrees, which is within acceptable limits.

Figure 4E:
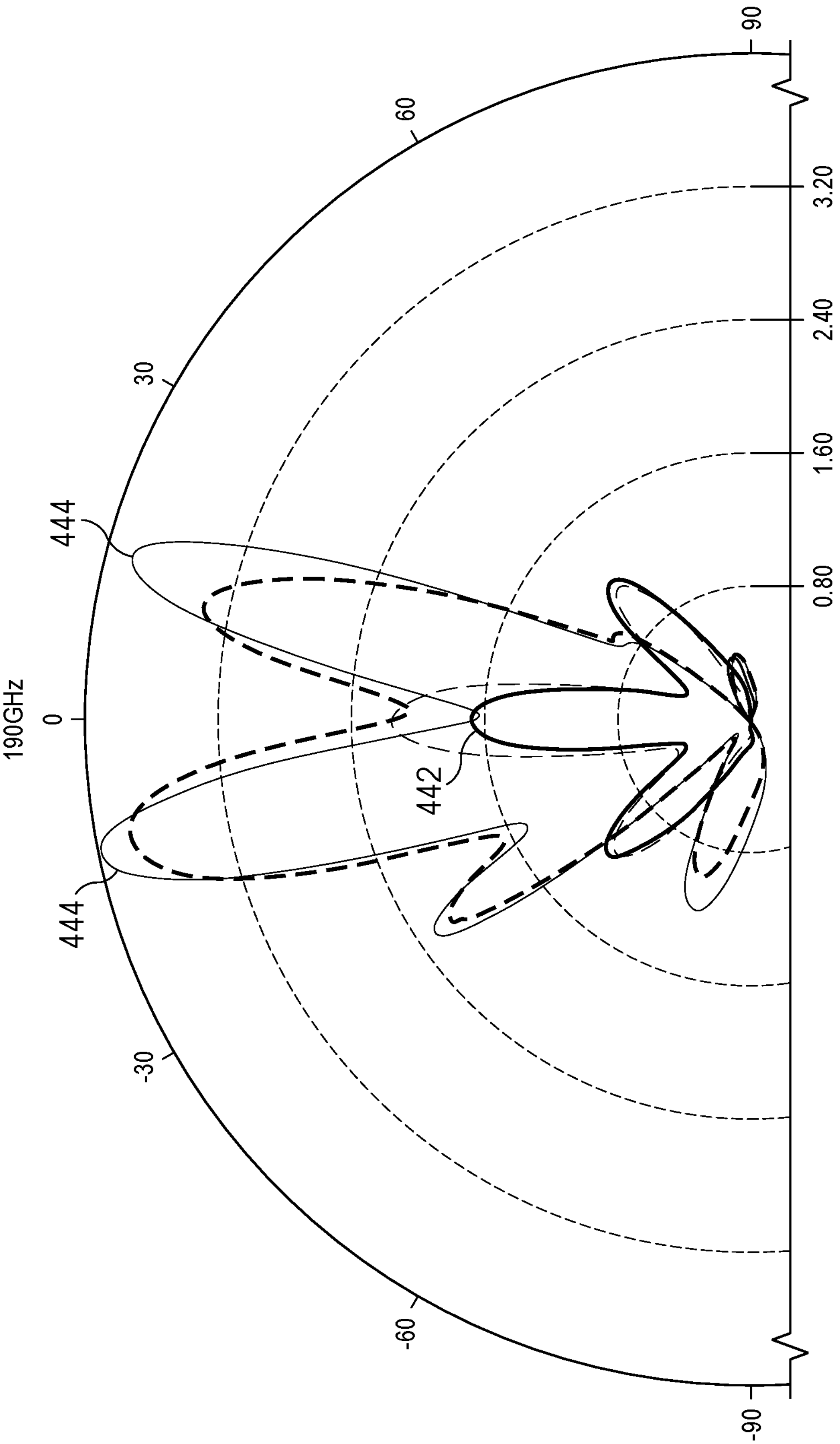

As shown in FIG. 4E, for a frequency of 190 GHz, the vertical radiation pattern of the antenna indicated by curve 442 has a major lobe extending from package upwards, as is desired for the arrangements. The horizontal radiation pattern of the antenna indicated by curve 444 has two major lobes extending from package at −12 degrees and +15 degrees, which is within acceptable limits.

Figure 5B:
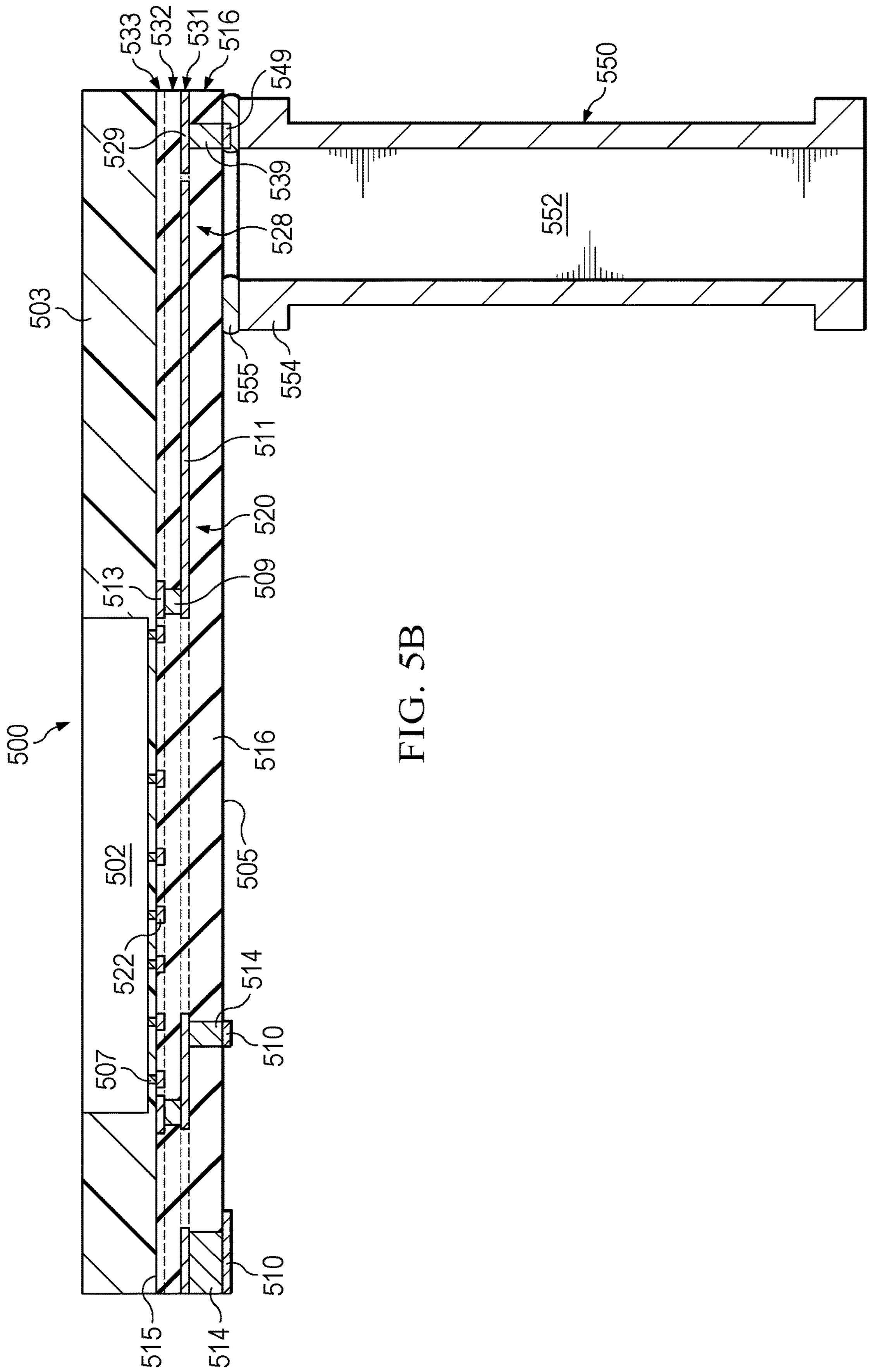

FIGS. 5A and 5B illustrate a microelectronic package 500, an example arrangement using a QFN package. In particular, FIG. 5A is a perspective view of package 500, and FIG. 5B is a conceptual cut-away view of package 500. QFN packages are one type of package that is useful with the arrangements. Other package types including leaded and other no lead packages can be used. The microelectronic package 500 includes a multilayer package substrate 504 with a waveguide radiation receiver 528 and a die attach contacts 522, a semiconductor die 502 mounted to the die attach contacts 522, and a tubular waveguide mounted over the waveguide radiation receiver 528. Semiconductor die 502 and its integrated circuit channels are electrically connected to waveguide radiation receiver 528 via multilayer package substrate 504. Semiconductor die 502 includes an integrated circuit including a transmitter-receiver providing channels for waveguide radiation receiver 528. Package 500 is substantially similar to microelectronic package 100 except microelectronic package 500 includes the semiconductor die 502 with a transmitter-receiver rather than the patch antenna 108, and a straight tubular waveguide 550 rather than the curved tubular waveguide 150. For brevity, many details of microelectronic package 100 are not repeated with respect to microelectronic package 500.

Multilayer package substrate 504 includes dielectric layer 532 and electrical conductors formed on and within dielectric layer 532. The electrical conductors of multilayer package substrate 504 include a first conductor layer 531 on a board side surface 505 (the bottom surface as the arrangement is oriented in FIG. 5B) of the multilayer package substrate 504, second conductor layer 533 on a topside surface 515 (the top surface as the arrangement is oriented in FIG. 5B), and vertical connectors 509, which extend within dielectric layer 532.

The first conductor layer 531 forms the waveguide radiation receiver 528. The second conductor layer 533 forms the die attach contacts 522 for semiconductor die 502. A feed line 520 of conductors couples the waveguide radiation receiver 528 to the die attach contacts 522. The feed line 520 includes a conductive via 509 traversing the dielectric layer 532 electrically coupling a first portion 511 of the feed line 520 in the first conductor layer 531 to a second portion 513 of the feed line 520 in the second conductor layer 533, the first portion 511 adjacent the waveguide radiation receiver 528, and the second portion 513 adjacent the die attach contacts 522.

The waveguide radiation receiver 528 is a planar patch antenna formed of the first conductor layer 531 on the bottom surface 505 of the multilayer package substrate 504. The patch antenna includes a conductive probe adjacent the central aperture 552 of the tubular waveguide 550 and a ground plane 529 surrounding a profile of the central aperture central aperture 552. As described with respect to microelectronic package 100, the conductive probe is formed as a rectangular pattern in the first conductor layer 531. In an example arrangement, the rectangular pattern of the conductive probe has a length of between 100 to 500 micrometers and a width of between 100 to 500 micrometers. In the same or different example arrangement, corners of the rectangular pattern of the conductive probe form chamfers with a radius in a range of 10 to 150 micrometers.

The example waveguide radiation receiver 528 is configured for radiating signals in the rectangular waveguide WR5 range, between 140 and 220 GHz. In alternative arrangements, the waveguide radiation receiver 528 can be varied in dimensions to configure its patch antenna for other frequency ranges, for example between 30 GHz and 300 GHz (millimeter wave).

The tubular waveguide 550 is mounted to the multilayer package substrate 504 such that a central aperture 552 of the tubular waveguide 550 is over the waveguide radiation receiver 528. The waveguide 550 provides a straight extruded rectangular profile, although a curved extruded rectangular profile may also be used. A solder connection 555 is between the tubular waveguide 550 and the multilayer package substrate 504, mechanically coupling a flange 554 of tubular waveguide 550 to the multilayer package substrate 504. The solder connection 555 also provides an electrical connection to a ground plane 529 surrounding the waveguide radiation receiver 528.

For the QFN package 500, terminals 510 are formed of the first conductor layer 531 on the board side surface 505. Vertical connectors 514 extend from terminals 510 through layers of dielectric material of the multilayer package substrate 504 and coplanar with board side surface 505, where leads 512 are formed of conductors of a second conductor layer 533 of the multilayer package substrate 504 and coplanar with topside surface 515. Similarly, vertical connector 539 extends from the ground plane 529 through electrically insulating layer 516 to a partial ring 549 configured to receive the solder connection 555 to flange 554 of tubular waveguide 550. For example, the exposed portions of terminals 510 and partial ring 549 may be formed from a plated layer, such as copper, gold, silver, aluminum or an alloy thereof. In some arrangements, vertical connectors 514, 539 represent a common built-up layer over the first conductor layer 531.

Semiconductor die 502 is mounted to die attach contacts 522 on the topside surface 515 of the multilayer package substrate 504. The semiconductor die 502 in the illustrated example is flip chip mounted, so that an active surface of the semiconductor die 502 is oriented facing the topside surface 515 of the multilayer package substrate 504. Conductive post connects 507 (FIG. 5B) extend from the semiconductor die 502 to leads 512 and make electrical connections between semiconductor die 502 and die attach contacts 522 in the second conductor layer of multilayer package substrate 504. The topside surface 515 of the multilayer package substrate 504 and the semiconductor die 502 are covered with mold compound 503. In an alternative arrangement the mold compound 503 can surround the semiconductor die 502, leaving the inactive side exposed.

In FIG. 5A, the microelectronic package 500 is illustrated in a projection view and includes mold compound 503 covering the topside surface 515 of the multilayer package substrate 504, and surrounding and protecting the semiconductor die 502 and the topside surface of the multilayer package substrate 504. Terminals 510 on the board side surface 505 are configured for mounting to a system board, for example a printed circuit board. In such an example, the system board may include an aperture that allows waveguide 550 to extend to the other side of the printed circuit board. Leads 512 are formed on the topside surface 515 of the multilayer package substrate 504 can be formed of the same material as waveguide radiation receiver 528, for example, copper, gold, aluminum, silver, or an alloy of these. Protective plating layers such as palladium, nickel, gold or multiple layers of these can be form on the waveguide radiation receiver 528.

Although not shown in the illustration for simplicity of explanation, additional components such as passives or additional semiconductor devices can be mounted to the topside surface 515 of the multilayer package substrate 504. Leads 512 are formed on the topside surface of the multilayer package substrate 504 and couple the semiconductor die 502 to vertical connectors 514, which are conductors formed of the intervening conductor layers of the multilayer package substrate 504 that extend through dielectric material to the terminals 510.

The conductive probe of the patch antenna of waveguide radiation receiver 528 is a patterned conductor material that is coupled to a portion 511 of feed line 520 also formed in the first conductor layer 531. While the probe rectangular, circular, triangular, oval and other shapes can be used for the patch antenna. For example, waveguide radiation receiver 528 can be formed of copper or gold or alloys. Other conductive materials compatible with plating processes can be used, including silver and aluminum. The die attach contacts 522 are formed in second conductor layer 533, and can be formed of the same material or another conductor material, for example die attach contacts 522 can be formed of copper or gold. A mold compound 503 is shown overlying the multilayer package substrate 504, and protecting the semiconductor die 502. Mold compound 503 can be a thermoset mold compound of epoxy resin, another epoxy, a resin, or plastic.

Useful sizes for an example of the multilayer package substrate 504 could be from 2 to 7 millimeters by 2 to 7 millimeters, for example. The size of the multilayer package substrate can be varied depending on the size and number of semiconductor devices mounted, as well as the waveguide radiation receiver 128, so that the area of the topside surface 515 is sufficient for mounting the semiconductor devices with the waveguide radiation receiver 528 spaced from the semiconductor devices on the board side surface 505. In other examples, the waveguide radiation receiver 528 may overlap the semiconductor devices.

As described with respect to microelectronic package 100, microelectronic package 500 can be formed using additive manufacturing, or build up processing, to form the multilayer package substrate 504 including the waveguide radiation receiver 528 and the die attach contacts 522.

Figure 6:
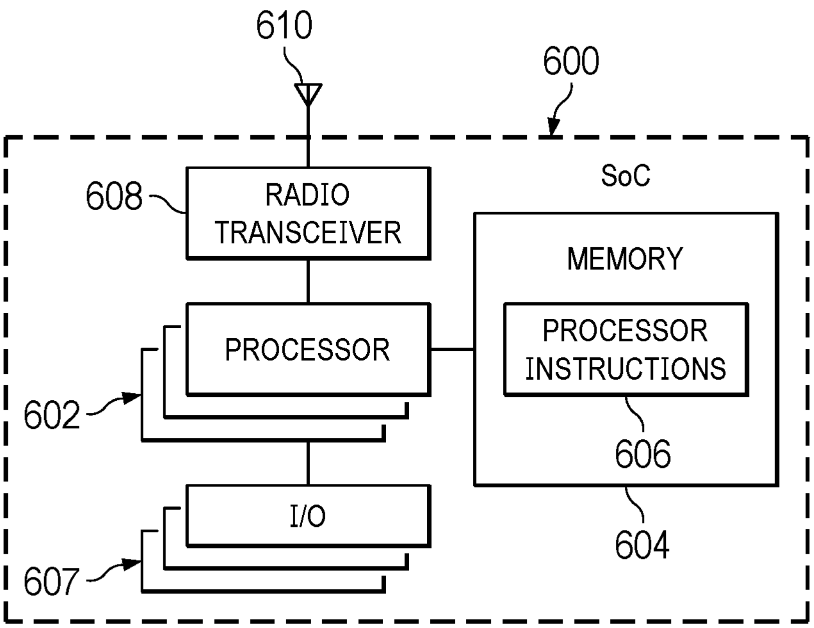
FIG. 6 shows a system on a chip (SoC) according to various examples.

Turning now to FIG. 6, a system on a chip (SoC) 600 is described. In various arrangements, SoC 600 may be utilized as semiconductor die 502 in microelectronic package 500. In an example, the SoC 600 comprises one or more processors 602, a memory 604 storing processor instructions 606, one or more input and/or output interfaces I/O 607, and a radio transceiver 608, a transmitter-receiver of SoC 600. In other examples, however, the one or more processors 602, the memory 604, the I/O 607, and the radio transceiver 608 may not be implemented as a SoC but may be implemented by two or more integrated circuits or components. The memory 604 comprises a non-transitory memory portion, and the processor instructions 606 are stored in the non-transitory memory portion of the memory 604. The radio transceiver 608 may be coupled to an external antenna 610, for example an antenna that is part of a system in which the SoC 600 is installed. In the example where SoC 600 may be utilized as semiconductor die 502 in microelectronic package 500, antenna 610 is waveguide radiation receiver 528. The SoC 600 is implemented as an integrated circuit (IC). The SoC 600 may find application in Wi-Fi access points (APs), cellular base stations, cellular mobile communication devices, Bluetooth radio devices, and other radio devices. The SoC 600 may be embedded in industrial sensors and remote-control appliances.

The processor 602 may read the processor instructions 606 from the memory 604 and execute the processor instructions 606. In an example, some of the processor instructions 606 may cause the processor 602 to modulate signals to be transmitted by the radio transceiver 608 and demodulate signals received by the radio transceiver 608. In another example, the radio transceiver 608 may modulate signals received from the processor 602 and transmit the modulated signals via the antenna 610 and demodulate signals received via the antenna 610 and provide the demodulated signals to the processor 602. In general, executing the processor instructions 606 causes the processor 602 to perform or cause the performance of one or more of the actions described herein.

The use of the arrangements provides a microelectronic package with an integrated antenna and a waveguide. Existing methods, materials, and assembly tools are used to form the arrangements, and the arrangements may be cost effective when compared to solutions using additional circuit boards or modules to carry the antennas.

The specific techniques for semiconductor packages including integrated antennas with waveguides, including techniques described with respect to packages 100 and 500, are merely illustrative of the general inventive concepts included in this disclosure as defined by the following claims.

What is claimed is:

1. A microelectronic package, comprising:

a waveguide radiation receiver formed in a first conductor layer on a first surface of a multilayer package substrate;

a second conductor layer on a second surface of the multilayer package substrate spaced from the first conductor layer by a dielectric layer;

a tubular waveguide mounted to the multilayer package substrate such that a central aperture of the tubular waveguide is over the waveguide radiation receiver;

a transmitter-receiver on the second surface of the multilayer package substrate; and a feed line coupling the waveguide radiation receiver to the transmitter-receiver, the feed line including a conductive via traversing the dielectric layer coupling a first portion of the feed line in the first conductor layer to a second portion of the feed line in the second conductor layer, wherein the first conductor layer includes a ground plane around a profile of the central aperture and wherein the tubular waveguide is coupled to the ground plane.

2. The microelectronic package of claim 1, further comprising a solder connection between the ground plane and the tubular waveguide.

3. The microelectronic package of claim 2, further comprising a built-up layer over the first conductor layer between the solder connection and the ground plane.

4. The microelectronic package of claim 1, wherein the tubular waveguide provides an extruded rectangular profile.

5. The microelectronic package of claim 4, wherein the extruded rectangular profile is selected from the group consisting of:

a straight extruded rectangular profile; and a curved extruded rectangular profile.

6. The microelectronic package of claim 1, wherein the waveguide radiation receiver formed in the first conductor layer includes a conductive probe adjacent the central aperture of the tubular waveguide.

7. The microelectronic package of claim 6, wherein the conductive probe is formed as a rectangular pattern in the first conductor layer.

8. The microelectronic package of claim 7, wherein the rectangular pattern of the conductive probe has a length of between 100 and 500 micrometers and a width of between 100 and 500 micrometers.

9. The microelectronic package of claim 7, wherein corners of the rectangular pattern of the conductive probe form chamfers with a radius in a range of 10 to 150 micrometers.

10. The microelectronic package of claim 1, wherein the microelectronic package is a leadless package.

11. The microelectronic package of claim 1, wherein the transmitter-receiver is a patch antenna formed in the second conductor layer.

12. The microelectronic package of claim 11, wherein the transmitter-receiver further comprises a planar ground ring formed of the second conductor layer around the patch antenna.

13. The microelectronic package of claim 12, further comprising an elevated ground ring formed with an elevated trace over the planar ground ring of the second conductor layer.

14. The microelectronic package of claim 11, wherein the patch antenna is formed as a rectangular pattern in the second conductor layer, the rectangular pattern having a width of between 1 and 4 millimeters, and having a length of between 1 and 4 millimeters.

15. The microelectronic package of claim 11, wherein the patch antenna includes a planar antenna formed of the second conductor layer in a bow-tie shape, a rectangular shape, a circular shape, a triangular shape, or an oval shape.

16. The microelectronic package of claim 1, further comprising a semiconductor die on the second surface of the multilayer package substrate including the transmitter-receiver, the semiconductor die coupled to the second conductor layer.

17. The microelectronic package of claim 1, further comprising a mold compound covering the transmitter-receiver and at least a portion of the multilayer package substrate.

18. The microelectronic package of claim 1, wherein the transmitter-receiver and the waveguide radiation receiver are configured to radiate signals at frequencies between 30 GHz and 300 GHz.

19. The microelectronic package of claim 1, wherein the transmitter-receiver and the waveguide radiation receiver are configured to radiate signals at frequencies between 140 GHz and 220 GHz.

20. The microelectronic package of claim 1, wherein the dielectric layer between the first conductor layer and the second conductor layer includes acrylonitrile butadiene styrene (ABS), acrylonitrile styrene acrylate (ASA), or epoxy resin mold compound.

21. A method of forming a microelectronic package, comprising:

forming a waveguide radiation receiver in a first conductor layer on a first surface of a multilayer package substrate;

forming a second conductor layer on a second surface of the multilayer package substrate spaced from the first conductor layer by a dielectric layer;

forming a transmitter-receiver on the second surface of the multilayer package substrate;

forming a feed line coupling the waveguide radiation receiver to the transmitter-receiver, the feed line including a conductive via traversing the dielectric layer coupling a first portion of the feed line in the first conductor layer to a second portion of the feed line in the second conductor layer; and mounting a tubular waveguide to the multilayer package substrate such that a central aperture of the tubular waveguide is over the waveguide radiation receiver, wherein mounting the tubular waveguide to the multilayer package substrate includes soldering the tubular waveguide to the first conductor layer at a ground plane around a profile of the central aperture.

22. The method of claim 21, wherein forming the waveguide radiation receiver comprises plating the first conductor layer on a seed layer, the first conductor layer comprising copper, gold, silver, aluminum, or an alloy thereof.

23. The method of claim 21, wherein the transmitter-receiver is a patch antenna, the method further comprising forming the patch antenna in the second conductor layer.

24. The method of claim 21, wherein forming the transmitter-receiver comprises mounting a semiconductor die to the second surface of the multilayer package substrate, wherein the semiconductor die includes the transmitter-receiver.

25. The method of claim 21, further comprising molding a mold compound to cover the transmitter-receiver and at least a portion of the multilayer package substrate.

* * * * *